T. G. DADE.
METHOD OF MANUFACTURING WHEEL TREADS.
APPLICATION FILED JAN. 8, 1917.
1,303,859.
Patented May 20, 1919.
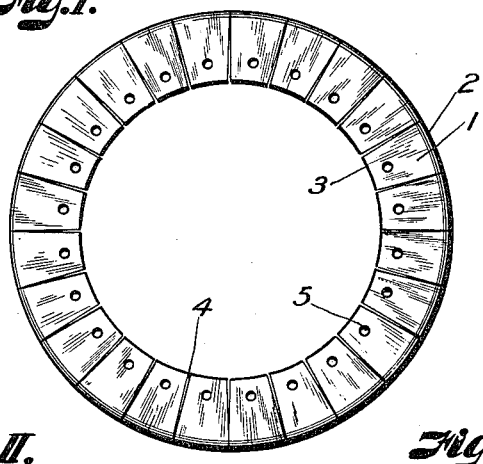
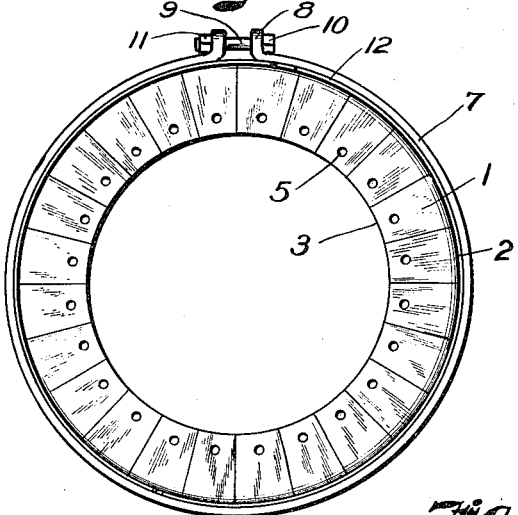
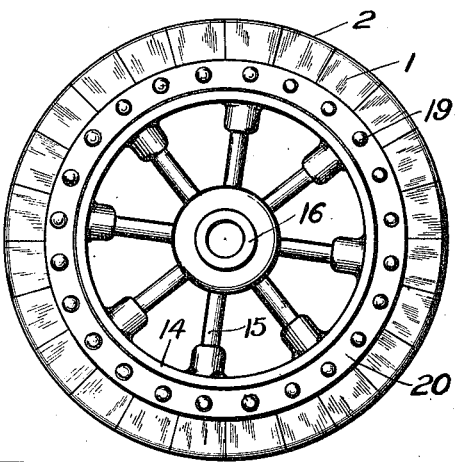
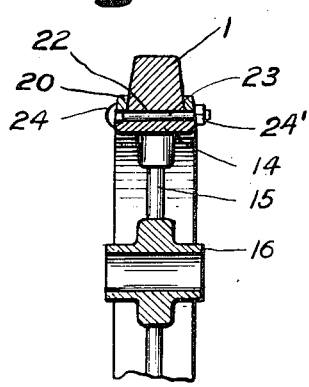
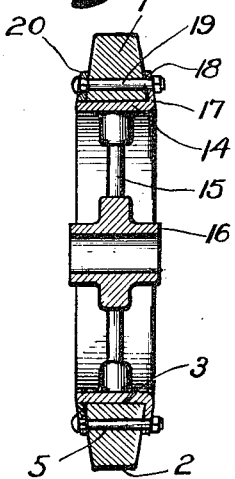
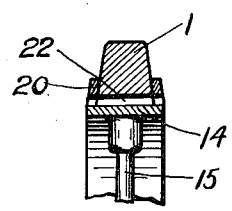
INVENTOR.
Thomas G. Dade.
BY Arthur C. Brown
ATTORNEY

UNITED STATES PATENT OFFICE.

THOMAS G. DADE, OF FORT SMITH, ARKANSAS.

METHOD OF MANUFACTURING WHEEL-TREADS.

1,303,859.   Specification of Letters Patent.   Patented May 20, 1919.

Application filed January 8, 1917. Serial No. 141,309.

*To all whom it may concern:*

Be it known that I, THOMAS G. DADE, a citizen of the United States, residing at Fort Smith, in the county of Sebastian and State of Arkansas, have invented certain new and useful Improvements in Methods of Manufacturing Wheel-Treads; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a method of manufacturing wheel treads, and more particularly to wheels for use on trucks adapted for operation on concrete or wood floor docks, warehouses, or the like; the principal object of the invention being to provide a tread for wheels of this character which is more durable than the ordinary pneumatic or solid rubber tire, is less noisy than a metal tire, and less liable to destroy or crush a concrete floor or chip the edges of a board floor.

More particularly the invention relates to the use in a wheel tread of a plurality of separate wooden blocks so cut and shaped that when assembled and finished they form a ring that may be applied to a wheel rim to form a tread for the wheel; the particularly novel feature consisting of the assemblage of the separate blocks, their treatment prior to application to the wheel rim, and the method of attaching the blocks to the rim.

As illustrative of the invention I accompany the description with drawings of the tread in its various stages, and wherein:

Figure I is an elevation of assembled blocks as they appear prior to the application of the clamping device.

Fig. II is an elevation of the blocks and their clamp, showing the blocks brought into close relation.

Fig. III is an elevation of a wheel equipped with a tread manufactured by my improved method.

Fig. IV is a cross-section of the wheel.

Fig. V is a similar view of a modified form of wheel, comprising a keeper ring at each side of the tread.

Fig. VI is a cross-section on the line VI—VI, Fig. V.

Referring more in detail to the drawings:

1 designates blocks of any suitable hard wood, preferably having a regular grain, and with the blocks cut wedge-shape and with the grain, so that the grain runs longitudinally of the blocks and, therefore, radially with the wheel upon which the blocks are mounted when the tread is formed. The blocks are also formed with outer tread surfaces 2 and inner rim surfaces 3 shaped concentrically, so that when the blocks for a tread are assembled on a wheel the inner tread surface may bear closely against the wheel rim and the outer surface may form the circular bearing surface of the wheel tread.

In cutting the blocks I preferably use a die, or the like, and effect the cutting with a chisel, or such suitable tool that the meeting faces of the blocks may be perfectly plain, in order that when the blocks are assembled in the tread ring they may fit snugly together and form a close, compact tread. The outer ends of the blocks are also shaped to the desired curvature to give the tread its outer periphery, but the inner ends and side faces of the blocks have extra stock, which is turned down in a lathe when the blocks are assembled in their clamp ring as presently described.

As the grain runs longitudinally of the blocks and the blocks are wedge-shape, it is apparent that there will be short grain sections at the outer corners of the blocks which might weaken the structure because of the tendency of the blocks to chip along the short grain. In order to obviate this disadvantage I so shape the blocks that their inner ends are smaller than would be required to form perfect segments, and thereby provide for spaces 4 between the blocks when the latter are collected or assembled loosely and before they are clamped to form the compact tread ring. Each of the blocks is also provided with a transverse aperture 5 through which a bolt may be projected to attach the block individually to the rim flange of a wheel body.

Blocks so shaped are assembled to form a loose ring (Fig. I), and when so assembled, with their outer corners in contact, a clamp band 7 is placed thereover to inclose the ring. The band 7 preferably consists of a single piece of resilient strap metal having outturned ends forming ears 8 that lie closely adjacent and face each other to receive a bolt 9 having a head 10 engaging the outer face of one of the ears and a nut 11 engaging the outer face of the other ear, so that when the nut is tightened on the bolt the ears are drawn together and the band tightened against the outer periphery of the tread ring.

In order to form a close fit between the band and the periphery of the tread ring so that an even pressure is exerted on all of the blocks, I preferably locate filler members 12 between the band and ring before the clamp is tightened. When the ring is in place and tightened as described the blocks are brought into close relation and the outer portions of the blocks pressed to a greater degree than the inner portions in order to fully compress the short grain sections and form a rigid and substantial joint at such points that will obviate any chipping or deformation of the blocks when the tread is in use.

When the clamp is fully tightened and the blocks brought into their close compact relation the ring with the clamp thereon is placed in a lathe and turned down on its inner periphery to the proper diameter and on its side faces to the proper width and bevel. The blocks, still retained in the clamp ring, are then placed in a treatment apparatus, wherein water-proofing fluid is forced under pressure into the fiber of the wood to thoroughly saturate the blocks and render them water-proof.

After the ring has been so treated it is applied to a wheel rim, one form of which is illustrated in the drawings and comprises the rim base 14 that is carried on the spokes 15 from a hub 16 and has an integral flange 17 at one edge provided with apertures 18 through which bolts 19 may be extended. The rim also comprises a loose ring 20 which is adapted to fit snugly over the rim base 14 against the tread ring when the latter is in place.

With a wheel of this construction, having its rim base 14 of a diameter corresponding to the inner diameter of the tread ring, the ring may be slipped over the rim base and abut against the side flange 17. When the tread ring is in place on the rim the loose ring 20 is placed over the rim base and against the tread ring and the bolts 19 placed one through each of the ring blocks so that the blocks are held individually to the wheel. After the tread ring has been securely attached to the wheel rim in this manner and the clamp band is removed, it is apparent that a wheel of this construction will have desirable lasting qualities, as the wear will be on the end of the grain in the blocks; that it will be noiseless in use on a concrete or other floor, and that it will have resiliency under load without compression that would tend to increase the draft in the manner incident to rubber tires.

When using the tread with a wheel comprising a keeper ring for each side of the tread, I provide the blocks and rings with transverse grooves 22 at their inner peripheries and attach the rings and tread to the wheel rings by bolts 23, having heads 24 engaging the rings and wheel rim at one side of the wheel and nuts 24' engaging the ring and rim at the other side of the wheel to hold the tread in place.

Having thus described my invention what I claim as new therein, and desire to secure by Letters-Patent, is:—

1. The method of manufacturing wheel treads, consisting of combining individual blocks to form a ring, clamping the blocks from their outer periphery to compress the same against each other, and attaching the blocks individually to a wheel rim.

2. The method of manufacturing wheel treads, consisting of combining individual blocks to form a ring, clamping the blocks from their outer periphery to compress the same against each other, attaching the blocks individually to a wheel rim and removing the clamp.

3. The method of manufacturing wheel treads, consisting of assembling individual blocks to form a ring, clamping the ring from the exterior to compress the blocks radially and circumferentially, attaching the blocks individually to a wheel rim while retained in their clamp, and removing the clamp.

4. The method of manufacturing a wheel tread consisting of cutting individual blocks to a wedge-shape and forming concentric outer and inner peripheries thereon with the inner ends of the blocks incut to form spaces between adjacent blocks when the latter are assembled with the outer edges thereof in contact, applying a circular clamp to the outer peripheries of the blocks to compress the outer portions thereof and close the openings between the inner ends thereof, applying the ring so formed to a wheel rim, attaching the blocks individually to said rim, and removing the clamp.

5. The method of manufacturing wheel treads consisting of assembling individual blocks to form a ring, clamping the ring from the exterior to compress the blocks, shaping the blocks while assembled in the ring, applying the ring to a wheel rim and removing the clamp.

6. The method of manufacturing wheel treads consisting of assembling individual blocks to form a ring, clamping the ring from the exterior to compress the blocks, turning the ring in a lathe to shape the sides and inner surfaces of the blocks, attaching the blocks individually to a wheel rim while retained in the clamp and removing the clamp.

In testimony whereof I affix my signature.

THOMAS G. DADE.